May 15, 1934.  J. SNEED  1,958,681
BRAKE HOOK-UP
Filed Sept. 16, 1929
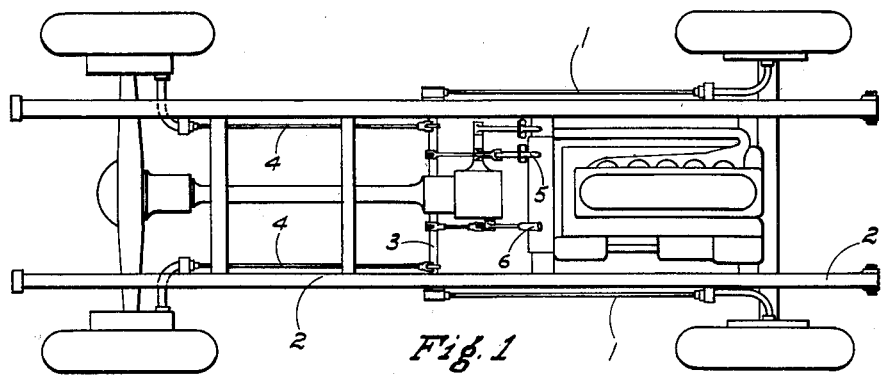
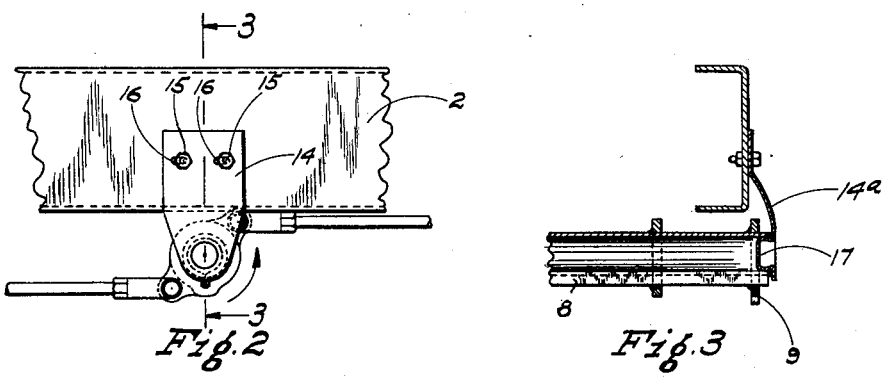
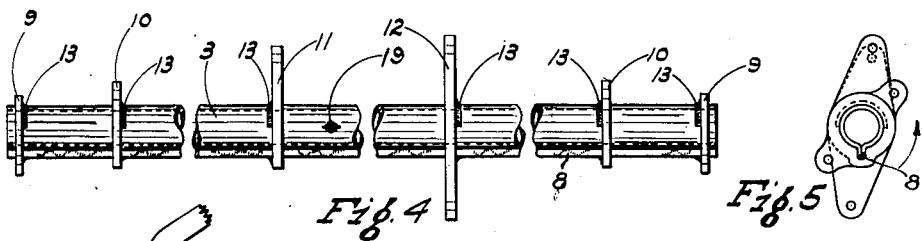
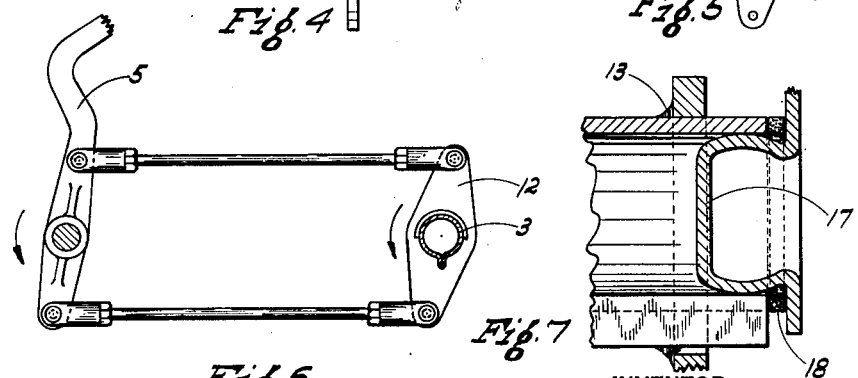
INVENTOR
JOHN SNEED
BY
ATTORNEY Patented May 15, 1934

1,958,681

UNITED STATES PATENT OFFICE 1,958,681

BRAKE HOOK-UP

John Sneed, Ferndale, Mich., assignor to The Midland Steel Products Company, Cleveland, Ohio, a corporation of Ohio, as trustee for Steeldraulic Brake Corporation, Detroit, Mich., a corporation of Michigan Application September 16, 1929, Serial No. 392,839

4 Claims. (Cl. 64—29)

This invention relates to brake operating mechanism and more particularly to cross shafts and the parts associated therewith.

In automotive vehicles it is common practice to provide a rotatable brake operating shaft extending transversely of the vehicle frame. This shaft carries lever arms to which are attached brake actuating rods or cables. When the shaft is rotated by movement of the brake pedal or hand lever the brakes are applied or released.

It is among the objects of my invention to provide a tubular brake operating cross shaft requiring a minimum of parts and being adapted to quick and easy assembly; to provide a cross shaft on which the actuating levers can readily and accurately be attached, to provide a cross shaft assembly having shaft supporting brackets with integral bearing portions, to provide a cross shaft assembly which may be economically built up from stamped and tubular elements; to provide a tubular cross shaft having end bearings which may be continuously lubricated from a supply of lubricant contained in the tubular shaft.

The above and other objects of my invention will appear from the following description of a preferred form, reference being had to the accompanying drawing.

In the drawing, Fig. 1 is a diagrammatic view of a motor vehicle chassis showing my cross shaft in place; Fig. 2 is a side elevation showing my cross shaft and supporting bracket; Fig. 3 is a section taken on the line 3—3 of Fig. 2 showing one end of my cross shaft and its support; Fig. 4 is a detached view of my cross shaft; Fig. 5 is an end view of the shaft shown in Fig. 4; Fig. 6 is a side elevation of the connection between the brake pedal and the cross shaft; and Fig. 7 is an enlarged fragmentary view of one end of the cross shaft and bearing.

The automobile illustrated in Fig. 1 is equipped with suitable four wheel brakes. The front brakes are actuated by the brake rods 1, 1 which are preferably disposed outside of the frame 2 and attached to levers on the cross shaft 3. In like manner the rear brakes are actuated by brake rods 4 which extend rearwardly inside of the frame. The foot pedal 5 is connected to the shaft 3 by rigid links, as will be more fully described, and the hand lever 6 is connected by a flexible cable. This permits the brakes to be operated by the foot pedal without moving the hand lever 6.

In the preferred form of my invention illustrated in the drawing, the tubular shaft 3 is formed from a flat strip rolled into tubular form with its edge portions bent out and butted to form a key 8. These edges may be chamfered to form a V-edge on the key 8 which V-edge or the bent-out edge portions may be welded throughout all or part of the length of the shaft. As the tube 3 is preferably used as a lubricant reservoir, it is advantageous to weld or otherwise seal the entire seam to form a fluid-tight tube.

The front brake levers 9, 9, rear brake levers 10, 10, emergency brake lever 11 and foot pedal arm 12 all have holes and keyways adapted to fit the shaft 3 and its integral key 8. The keyways in these lever members are so disposed relative to the axes of the levers that when they are assembled on the shaft 7, each lever has the proper angular position relative to the others. This is best shown in Figs. 4 and 5. To keep the levers 9, 10, 11 and 12 in lateral position and make a more rigid structure, they may be welded to the shaft 3 as indicated at 13. All such levers and arms may be punched from strip stock with great saving of time and material. Each lever is punched to have a central hole through which the body of the shaft extends and each lever also has a key-way for engaging the key part 8 of the shaft. The holes and key-ways in the several levers are of such size that they fit the shaft snugly consistent with such clearance as will facilitate ready assembly.

The shaft 3 is supported beneath the vehicle frame 2 by the bearing brackets 14. These brackets 14 may be secured to the frame 2 by such means as bolts 15 which pass through the frame and through slotted holes 16 in the upper part of the bracket. This mounting permits a certain degree of forward and back adjustment of the brackets 14 and the shaft 3 which they support. The brackets 14 have obliquely outwardly and downwardly extending portions 14a and integrally formed drawn and pressed knob shaped bearing portions 17. The largest diameter of the bearings 17 preferably occurs at a point between its ends (see Fig. 7) and this diameter is such as to provide a proper internal bearing for the shaft. Washers 18, preferably of hard felt or the like, may be interposed between the ends of the shaft and the brackets 14 and serve to reduce friction, prevent dirt from entering the bearing and lubricant from escaping from the shaft.

The brackets 14 are preferably pressed and formed from sheet stock and have an inherent resiliency whereby they embrace between them the body of the shaft, thus maintaining a tight joint between the washers 18, brackets 14 and the ends of the shaft and prevent any objectionable endwise movement or rattling of the shaft and associated parts.

Fig. 6 illustrates a form of brake pedal linkage which will cause the cross shaft 3 to rotate by delivering to it an unbalanced couple without subjecting it to bending stress. This relieves the end bearings of the major part of the usual load except the weight of the parts supported and allows a much lighter shaft and bearing construction than would be possible if the foot pedal equalizing linkage were not used. It will be noted (Figs. 4 and 5) that the levers 9 and 10 are arranged diametrically opposite each other whereby unbalanced couples are delivered from the ends of the shaft to the fore and aft brake rods. This arrangement of parts insofar as the direction and disposition of forces is concerned is not a part of this invention, but this invention, relating as it does to the shaft construction and assembly, is admirably adapted to transmit and distribute such forces.

From the above description it will be seen that I have provided a tubular cross shaft having an external key which serves to reinforce the tube and also to hold in place the various levers which are secured to the shaft. My improved end bearing construction requires only a pair of simple stamped brackets having bearing surfaces formed thereon, the coacting bearing surfaces being the inside of the tubular shaft.

The hollow tubular shaft provides a large grease reservoir and a pressure lubricating fitting 19 may be tapped into the shaft 3 at any desired place. By forcing grease into the shaft through the fitting 19 the end bearings may be positively and continuously lubricated.

Although I have illustrated and described herein but one form of my cross-shaft construction and assembly, I do not wish to be limited to the specific structure disclosed, as various modifications may be made without departing from the spirit of my invention, or in any manner other than by the claims appended hereto.

I claim:—

1. A torque transmitting shaft of a single piece of tubular stock having at least portions of its longitudinal edges turned at an angle to the body of the stock and having the stock between said edges forming the tube with said turned edges contacting with each other and extending radially outward from the body of the shaft and forming a key extending lengthwise of the shaft.

2. A torque transmitting cross shaft which comprises a shaft of a single strip of stock in tubular form with its longitudinal edge portions angularly turned with relation to the body portion, said edge portions lying back to back and having their extremities chamfered to form a V-edge, and said V-edge portion being welded throughout the length of the shaft.

3. A tubular torque transmitting cross shaft adapted to transmit force from a brake operating pedal to instrumentalities for operating the brakes of an automotive vehicle, said shaft comprising a split tubular body having its stock adjacent the split portion turned at an angle and in back to back relation to form a radial key, the edges of said angularly turned stock being chamfered to form a V-groove throughout the length thereof, and said edge portion being welded throughout the length of the shaft.

4. A torque transmitting shaft of a single piece of sheet metal stock in tubular form and having at least a portion of a longitudinal edge bent at an angle to the body of the tube and extended radially outward of the body to form an integral key extending longitudinally of the shaft to prevent relative turning movement of a member embracing the shaft.

JOHN SNEED.